US008651853B2

(12) United States Patent
Dupuis et al.

(10) Patent No.: US 8,651,853 B2
(45) Date of Patent: Feb. 18, 2014

(54) EQUIPMENT FOR PRODUCING VESSELS COMPRISING A VARIABLE PITCH TRANSFER WHEEL

(75) Inventors: Pascal Dupuis, Octeville sur Mer (FR); Daniel Nguyen Van, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 237 days.

(21) Appl. No.: 13/146,059

(22) PCT Filed: Jan. 26, 2010

(86) PCT No.: PCT/EP2010/050863
§ 371 (c)(1),
(2), (4) Date: Jul. 25, 2011

(87) PCT Pub. No.: WO2010/084204
PCT Pub. Date: Jul. 29, 2010

(65) Prior Publication Data
US 2011/0287127 A1    Nov. 24, 2011

(30) Foreign Application Priority Data

Jan. 26, 2009   (FR) ...................................... 09 50440

(51) Int. Cl.
*B29C 49/36*   (2006.01)
*B29C 49/42*   (2006.01)
*B29C 31/08*   (2006.01)

(52) U.S. Cl.
USPC ..................... 425/524; 198/459.8; 198/474.1; 425/534; 425/537; 425/540

(58) Field of Classification Search
USPC ............... 425/524, 534, 537, 540; 198/459.8, 198/474.1
See application file for complete search history.

(56) References Cited

U.S. PATENT DOCUMENTS

| 2,468,255 | A | * | 4/1949 | Dunn ......................... 414/744.5 |
| 2,621,841 | A | * | 12/1952 | Simpson ......................... 53/279 |
| 4,880,102 | A | | 11/1989 | Indrebo |
| 6,436,330 | B1 | | 8/2002 | Winter |
| 7,581,635 | B2 | | 9/2009 | Lecomte |

FOREIGN PATENT DOCUMENTS

| DE | 10017050 | 10/2001 |
| EP | 1350612 | 10/2003 |
| FR | 2907438 | 4/2008 |
| WO | 2006/092652 | 9/2006 |
| WO | 2006/097796 | 9/2006 |

OTHER PUBLICATIONS

Partial machine translation of EP1350612A1 dated Oct. 8, 2003 obtained from the espace webpage.*

(Continued)

*Primary Examiner* — Robert B Davis
(74) *Attorney, Agent, or Firm* — Young & Thompson

(57) ABSTRACT

An equipment (10) for producing vessels (12), includes at least one variable pitch wheel (38) arranged between a blower (14) having a first pitch (P1) and a filler (16) having a second pitch (P2), and that includes transfer elements (40) controlled by control elements adapted for selectively varying the pitch between two successive transfer elements (40) between an initial pitch (P) and a final pitch (P'), the initial pitch (P) being for example equal to once or twice the first pitch (P1) and the final pitch (P') being equal to the second pitch (P2).

8 Claims, 6 Drawing Sheets

(56) References Cited

OTHER PUBLICATIONS

International Search Report dated May 11, 2010, corresponding to the PCT application.

French Search Report dated Sep. 8, 2009, corresponding to the PCT application.

\* cited by examiner

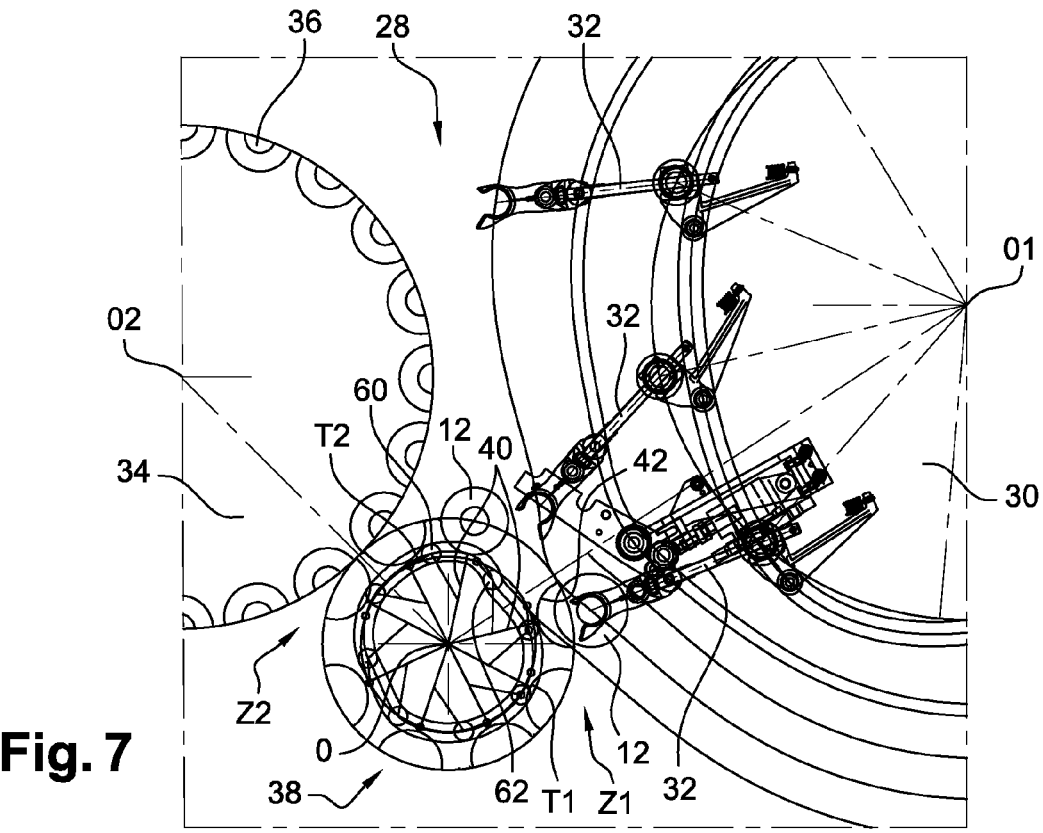
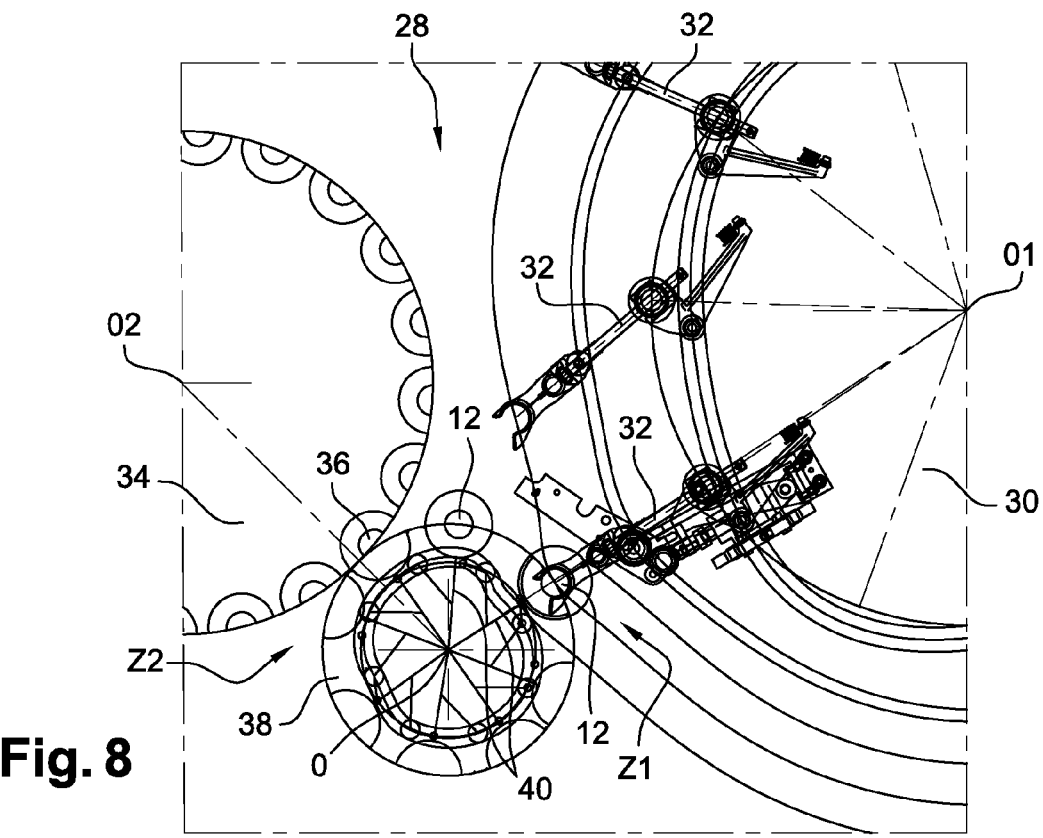

EQUIPMENT FOR PRODUCING VESSELS COMPRISING A VARIABLE PITCH TRANSFER WHEEL

The invention relates to an installation for producing vessels comprising a variable-pitch transfer wheel.

The invention relates more particularly to an installation for producing vessels, in particular bottles, comprising at least:

- a vessel production unit comprising at least one vessel blower which comprises a plurality of blowing stations which are distributed circumferentially around an axis of rotation with a spacing corresponding to a first pitch between two consecutive stations,
- a filling unit, called filler, comprising a plurality of filling stations which are distributed circumferentially around an axis of rotation with a spacing corresponding to a second pitch between two consecutive stations, and
- a vessel transfer device comprising at least a transfer wheel which, interposed between the vessel blower and the filler, comprises a plurality of vessel transfer means distributed circumferentially around an axis of rotation, said transfer means being mounted to move in rotation along a travel executed in a loop between, upstream, a first region for loading each vessel obtained from the vessel blower and, downstream, a second region for unloading each vessel to the filler.

Numerous installations of this type are known for the production of hollow vessels in which the vessel blower and the filler are produced in the form of rotary machines generally comprising a carousel with their various stations distributed over the circumference thereof.

The blowing stations of the vessel blower are thus evenly distributed angularly with a first determined pitch over the circumference of the carousel and each of the blowing stations conventionally comprises a mold and associated blowing or stretching-blowing means which are each capable of transforming at least one preform previously heat treated in an oven into a desired final vessel.

Similarly, the filling stations of the filler are evenly distributed angularly with a second determined pitch over the circumference of the carousel and each of the filling stations comprises at least filling means, such as nozzles, which are capable of filling each of the vessels obtained from the vessel blower situated upstream in the production installation with a given product.

The characteristics of a unit, such as a filler or a vessel blower, are in particular determined according to the vessel to be produced and the product to be packaged in the vessel.

Thus, depending on the applications, each unit comprises a determined number of stations, for example blowing or filling stations, which determines the production capacity of the unit, which is generally expressed as a number of vessels per hour.

However, the maximum number of stations of a unit is dependent on its radius or diameter and the space required for the location of a station of a given footprint such that the abovementioned rotary machines are generally characterized by a determined pitch corresponding to the spacing between two consecutive stations.

The pitch between two stations can be expressed in different ways, notably by the value of the circular arc linking two consecutive stations or else by the angle at the center associated with such an arc, or even by the number of stations.

It will be recalled that the perimeter of a circle of radius R is equal to $2\pi R$ such that the length of the circular arc separating two stations is obtained by means of the formula: $2\pi R\alpha/360$; in which the angle $\alpha$ corresponds to the abovementioned angle at the center.

For example, a filler whose filling stations are evenly distributed over the perimeter of the circle with an angle $\alpha$ equal to 36° will have ten stations, such a filler then being said to be of the "36PI" type, whereas a vessel blower said to be of the "45PI" type of the same radius will, conversely, have only eight stations distributed with an angle $\alpha$ of 45°.

Obviously, the greater the radius, the greater the perimeter so that, for a given station footprint, a greater number of stations can be located with a smaller angle $\alpha$ between two consecutive stations.

In the state of the art, the vessel production installations generally comprise vessel blowing and filling units having one and the same pitch, that is to say that the first pitch of the vessel blower is equal to the second pitch of the filler.

Thus, each vessel produced at a given vessel blowing station can be transferred to and filled at a corresponding filling station, the spacing between two successive vessels then being constant throughout the production travel from the vessel blower to the filler.

The transfer device interposed between the vessel blower and the filler then comprises at least one transfer wheel intended to ensure the transfer of each vessel from the output of the mold of the blowing station to the filling station.

However, it is desirable in some cases to be able to associate a filler and a vessel blower that have different operating pitches so that the transfer device must then be able to ensure a transfer of the vessels from one to the other.

In the abovementioned example of a filler of 36PI type and a vessel blower of 45PI type, this makes it possible in particular to retain a first existing 45PI standard transmission wheel, to limit the footprint of the installation and more particularly that of the filler or else to choose for the production of a given vessel the production means that are absolutely necessary, in particular because of the costs of such an installation.

This is why it is known in the state of the art to provide a vessel production installation with a vessel transfer device comprising at least, interposed between the vessel blower and the filler, a transfer wheel, called a variable-pitch transfer wheel, comprising vessel transfer means which are mounted to move in rotation and distributed circumferentially around an axis of rotation, said transfer means being controlled independently of one another by associated control means which are capable of selectively varying the pitch corresponding to the spacing between two successive transfer means in a travel executed in a loop between, upstream, a first region for loading each vessel obtained from the vessel blower and, downstream, a second region for unloading each vessel to the filler, said transfer means being introduced in succession, on the one hand, into said first loading region with an initial pitch corresponding at least to the first pitch of the vessel blower to occupy a determined loading position and, on the other hand, into said second unloading region with a final pitch corresponding to the second pitch of the filler to occupy a determined unloading position.

To this end, the present invention proposes a vessel production installation of the type described previously, characterized in that the control means of each transfer means of the variable-pitch wheel comprise variable-length means which, intended to ensure the variation of the pitch between at least the initial pitch and the final pitch, comprise at least a first link rod and a second link rod which are linked together at one of their ends by a pivoting link, the other end of the first link rod being securely attached via a first pivot to rotational driving means and the other end of the second link rod being securely attached via a second pivot to the associated transfer means.

Advantageously, the variable-pitch transfer wheel makes it possible to associate, in one and the same production installation, units, such as a vessel blower and a filler, that do not have the same operating pitch, but without the implementation of such a variable-pitch transfer wheel being limited to this sole application.

Thus, it is also possible to ensure a total operating flexibility when, the units having or not having the same operating pitch, there is a desire more particularly to use only some of the blowing stations but all the filling stations.

Advantageously, the vessels are displaced in rotation between the first and second regions over a constant radius by the transfer means of the variable-pitch transfer wheel.

According to other characteristics of the invention:

the control means comprise actuation means which, intended to selectively drive said variable-length means, comprise at least one roller which cooperates with a complementary guiding cam determining, in the loopwise travel of the transfer means, the variation of the pitch between the initial pitch and the final pitch of said transfer means relative to the transfer means directly preceding it in the direction of rotation of the variable-pitch wheel;

the roller of the actuation means has an axis of rotation which is common with the pivoting axis of the pivoting link linking the first and second link rods of the variable-length means;

the final pitch being less than the initial pitch, the cam comprises at least:

a first cam section which, arranged upstream of the loading position and downstream of the unloading position, is capable of slowing down the transfer means traveling over it to increase the spacing between this transfer means and the transfer means directly preceding it in the direction of rotation of the variable-pitch wheel so that each transfer means is introduced in succession into the loading position with an initial pitch which, determined relative to the transfer means preceding it, is at least equal to the first pitch of the vessel blower, in particular equal to twice the first pitch, and a second cam section which, arranged upstream of the unloading position and downstream of the loading position, is capable of speeding up the transfer means traveling over it to reduce the spacing between this transfer means and the transfer means directly preceding it in the direction of rotation of the variable-pitch wheel so that each transfer means is introduced in succession into the unloading position with a final pitch which, determined relative to the transfer means preceding it, is equal to the second pitch of the filler;

the vessel transfer device comprises, upstream, interposed between the vessel blower and the variable-pitch wheel, at least one first transmission wheel which, associated with the vessel blower, comprises first transmission means capable of unloading, from the blowing station, each vessel that is produced and of bringing said vessel into the first loading region of the variable-pitch wheel in order to transfer said vessel to the transfer means of the variable-pitch wheel positioned radially opposite;

the vessel transfer device comprises, downstream, interposed between the variable-pitch wheel and the filler, at least one second transmission wheel which, associated with the filler, comprises second transmission means capable of unloading, from the second unloading region, each vessel that is transferred by one of the transfer means of the variable-pitch wheel and of bringing each vessel to one of the filling stations of the filler;

the first transmission means of the first wheel are arranged with a constant spacing between two consecutive means, the value of which is equal to the first pitch of the vessel blower and the second transmission means of the second wheel are arranged with a constant spacing between two consecutive means, the value of which is equal to the second pitch of the filler;

the initial pitch of the variable-pitch wheel is equal to twice the value of the first pitch of the vessel blower, so that a transfer means of the variable-pitch wheel is introduced synchronously into the loading position at a rate of one blowing station out of two of the vessel blowers or at a rate of one transmission means out of two of a first transmission wheel;

the final pitch of the variable-pitch wheel is equal to the second pitch, so that a transfer means of the variable-pitch wheel is introduced synchronously into the unloading position to systematically transfer a vessel to each filling station or to each transmission means of a second transmission wheel.

Other features and advantages of the invention will become apparent from reading the following description, for an understanding of which reference should be made to the appended drawings in which.

Figure 1:
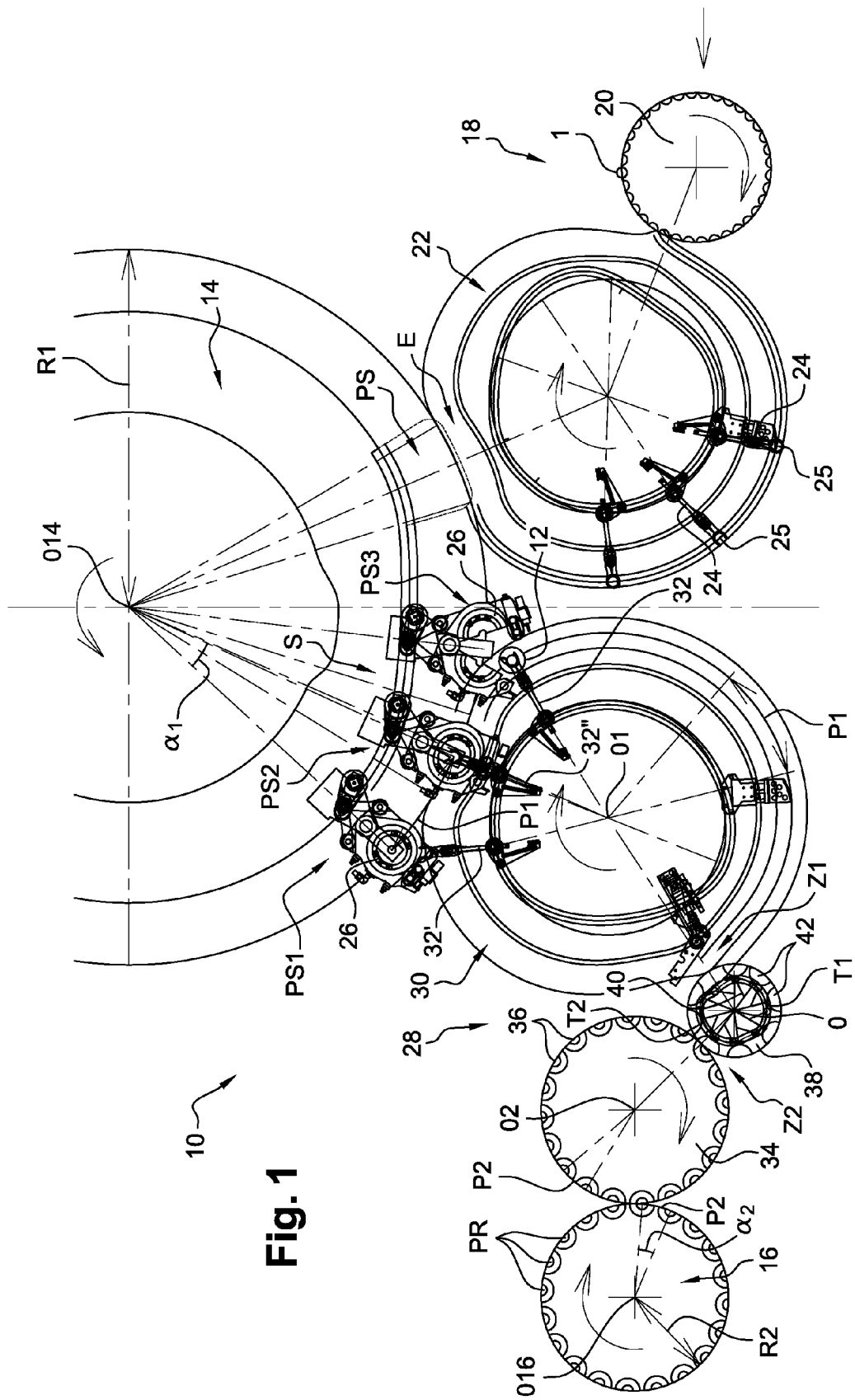
FIG. 1 is a plan view which partially represents an exemplary embodiment of a vessel production installation and which illustrates a transfer device comprising a variable-pitch transfer wheel according to the invention.

FIGS. 3 to 10 are plan views which represent in detail the intermediate variable-pitch transfer wheel of FIG. 1 and which, for a preferred application of the wheel according to the invention, illustrate in succession the positions of the transfer means of the wheel in the loopwise travel between the first loading region in which the transfer means follow one another with an initial pitch P equal to twice the first pitch P1 and the second unloading region in which the transfer means follow one another with a final pitch P equal to the second pitch P2.

By convention, in the following description and the claims, the terms "upstream" and "downstream" will be used in a nonlimiting manner to designate the general direction of circulation of the flow of vessels through the production installation.

FIG. 1 shows an exemplary embodiment of an installation 10 for producing vessels 12, such as bottles.

The installation 10 for producing vessels 12 comprises, in succession, a manufacturing unit comprising at least one unit (not represented) for heat treating preforms 1 made of plastic material associated with a vessel blower 14 and a filling unit 16, called filler.

As is known, the heat treatment unit comprises at least one oven which, provided with heating means such as infrared radiation lamps, is intended to heat treat preforms 1 made of plastic material, for example of PET, in order to allow for their subsequent transformation by blowing or by stretching-blowing in the manufacturing unit or vessel blower 14.

After having been heat treated, the preforms 1 are directly routed to the vessel blower 14 by a transfer device 18 which is interposed between the output of the oven and an input region E of the vessel blower 14.

The transfer device 18 comprises, for example, an output wheel 20 provided with notches and an associated transmission wheel 22.

The transmission wheel 22 comprises transmission means 24 intended, on the one hand, to remove in succession each preform 1 from a notch of the output wheel 20 in which the preform 1 is conventionally kept supported via its collar and, on the other hand, to transfer said preform 1 to the input region E of the vessel blower 14 in order to introduce said preform 1 into a mold 26 comprising at least one cavity in the form of the desired final vessel 12.

Each transmission means 24 comprises handling means 25 which are arranged at a free end of the transmission means 24 and cooperate with the preform.

Each transmission means 24 is controlled selectively to grip or place the preform 1, each transmission means 24 also being controlled to selectively perform a translational movement when gripping or placing a preform.

A transmission means 24 therefore operates, in succession, a first translational displacement to grip the preform on the output wheel 20, a rotation to the input region E of the vessel blower 14 and a second translational displacement to place the preform in the mold so that the preforms are not displaced over a constant radius during the transmission.

The vessel blower 14 comprises a carousel having a plurality of blowing stations PS which are evenly distributed circumferentially around an axis of rotation O14.

Only a bottom portion of the vessel blower 14 and a portion of the blowing stations PS are represented.

More specifically, FIG. 1 represents only three successive stations PS1, PS2 and PS3 in the output region S of the vessel blower 14, output region S in which the manufactured vessels 12 are unloaded.

The blowing stations PS have a spacing between two consecutive blowing stations which is equal to a first pitch P1.

By convention, the term "pitch" hereinafter in the description designates the spacing between two stations or two transfer means but it could, in a totally equivalent manner, be considered as the spacing between two consecutive vessels 12, for example the spacing between the vertical axes of the two consecutive vessels 12 taken as reference.

In the case of the vessel blower 14, the first pitch P1 corresponds to the circular arc linking two determined points each belonging to a blowing station PS, said circular arc being geometrically characterized by an angle "$\alpha_1$" represented at the center of the vessel blower 14 of radius R1.

Preferably, said determined points linked by the circular arc corresponding to a given pitch are points respectively merged with the main vertical orientation axis of the vessel 12 when a vessel occupies the blowing or filling station or the transfer/transmission means of a wheel of the transfer device 28.

Thus, the cycle of transformation into a vessel 12 of the preform 1 is implemented in succession along the circular travel around the axis of rotation O14 performed by each blowing station PS from the input region E, in which the loading is performed by the transmission means 24 of the transmission wheel 22 of the preform 1 previously heat treated in the oven, to the output region S.

Each blowing station PS is equipped with a mold 26 and associated blowing or stretching-blowing means (not represented) which are capable of transforming each preform 1 into a vessel 12.

Preferably, each mold 26 is a portfolio-type mold produced in two or three parts and comprising a single cavity to form the vessel 12.

The installation 10 comprises, downstream of the vessel blower 14, the filling unit or filler 16 comprising a plurality of filling stations PR which are evenly distributed circumferentially around an axis of rotation O16.

The filling stations PR have a spacing between two consecutive filling stations PR which is equal to a second pitch P2 corresponding to an angle "$\alpha_2$" between two consecutive filling stations PR or, in an equivalent manner, as explained previously, between two consecutive vessels 12.

Each filling station PR is equipped with means for filling the vessels 12 which, obtained from the vessel blower 14, are intended to be transmitted to it by a transfer device 28.

The installation 10 therefore comprises a vessel transfer device 28 which is interposed between the vessel blower 14 and the filler 16.

The transfer device 28 is intended, upstream, to successively unload each vessel 12 that is produced from the blowing station PS, or from one of the molds 26, and to transfer this vessel 12 downstream for it to be loaded at a filling station PR of the filler 16.

Preferably, the device 28 for transferring vessels 12 comprises at least one first transmission wheel 30 which is associated with the vessel blower 14.

The first transmission wheel 30 comprises first transmission means 32, such as arms, intended to successively unload each vessel 12 that is produced from the mold 26 to transfer it downstream.

As can be seen in FIG. 1, the spacing between the blowing stations PS1 to PS3 is equal to the first pitch P1.

Similarly, the first transmission means 32 of the first wheel 30 are arranged around an axis of rotation O1 with a constant spacing equal to the first pitch P1 between two consecutive means 32.

The vessels 12 therefore have between them a first pitch P1 at the output of the vessel blower 14, which pitch P1 is retained by the first transmission wheel 30.

Preferably, the transfer device 28 comprises a second transmission wheel 34 which is associated with the filler 16 and which comprises second transmission means 36.

The spacing between two consecutive filling stations PR of the filler 16 is equal to a second given angle $\alpha_2$, the value of the second angle $\alpha_2$ corresponds to the second pitch P2 which is different from the first pitch P1.

Preferably, the second transmission means 36 of the second wheel 34 are arranged with a constant spacing between two consecutive means 36 with a value equal to the second pitch P2.

Advantageously, the value of the second angle $\alpha_2$ is less than the value of the first angle $\alpha_1$ and the second pitch P2 is less than the first pitch P1.

In order to provide each of the filling stations PR of the filler 16 with a vessel 12, it is necessary to modify the value of the pitch between two successive vessels 12, that is to say, in this case, to change from the first pitch P1 to the second pitch P2.

Advantageously, the transfer device 28 comprises at least one transfer wheel 38, called a variable-pitch transfer wheel, which is capable of modifying the value of the pitch between two consecutive vessels 12 in order for the vessels taken upstream with a first pitch P1 to be transferred downstream with a second pitch P2.

For this, the variable-pitch wheel 38 comprises a plurality of transfer means 40 which are distributed circumferentially around an axis of rotation O and which are each provided at a free radial end with means 42 for holding a vessel 12.

The transfer means 40 of the wheel 38 are independent of one another and are mounted to move in rotation around the axis O along a travel executed in a loop between a first region Z1 for loading each vessel 12 obtained from the vessel blower 14 and a second region Z2 for unloading each vessel 12 to the filler 16.

Advantageously, the vessel transfer device 28 comprises at least said variable-pitch transfer wheel 38 which is interposed between the vessel blower 14 and the filler 16.

Advantageously, the transfer means 40 of the variable-pitch wheel 38 are controlled independently of one another by associated control means 44, said control means 44 being capable of selectively varying, in said travel, the value of the pitch corresponding to the spacing between two successive transfer means 40, that is to say, between two consecutive vessels 12, respectively between an initial pitch P and a final pitch P'.

Advantageously, the control means 44 are capable of selectively varying the value of the pitch so that the transfer means 40 are introduced in succession, on the one hand, to occupy a determined loading position in the first loading region Z1 with an initial pitch P corresponding at least to the first pitch P1 of the vessel blower 14 and, on the other hand, to occupy a determined unloading position in the second unloading region Z2 with a final pitch P' corresponding to the second pitch P2 of the filler 16.

The initial pitch P is therefore determined according to the vessel blower 14 and to the first pitch P1 and the final pitch P' according to the filler 16 and to the second pitch P2, the second pitch P2 being less than the pitch P1 when the filling stations PR are closer to one another than the blowing stations PS whose molds 26 require a greater space, in particular to enable them to be opened.

Preferably, the device 28 for transferring the vessels 12 comprises, from upstream to downstream, the first transmission wheel 30, the variable-pitch wheel 38 and the second transmission wheel 34.

The variable-pitch wheel 38 is interposed between the first transmission wheel 30 and the second transmission wheel 34 so that the first transmission wheel 30 is interposed between the vessel blower 14 and the variable-pitch wheel 38 and the second transmission wheel 34 is interposed between the variable-pitch wheel 38 and the filler 16.

Each of the wheels 30, 34 and 38 is positioned so as to present a portion which is tangential to the adjacent wheel or unit 14, 16 in order to define common transmission or transfer regions in which the vessel 12 is loaded or loaded from one to the other.

As a variant, the transfer device 28 does not comprise first and second transfer wheels 30, 34 but only a variable-pitch wheel 38 which is directly interposed between the vessel blower 14 and the filler 16.

The first transmission wheel 30 is capable of bringing into the first loading region Z1 each vessel 12 borne by one of its transmission means 32, radially opposite the holding means 42 of a transfer means 40 of the variable-pitch wheel 38 located in the loading position in order to transfer said vessel 12 to it.

The second transmission wheel 34 comprises second transmission means 36 which are intended to successively load into the second unloading region Z2 each vessel 12 transferred by the wheel 38, from the first loading region Z1 to said second unloading region Z2, with an automatic variation of pitch from the initial pitch P, which is, for example, equal to the first pitch P1, to the final pitch P which is equal to the second pitch P2.

After having completed such a loading of the vessel 12, the second transmission wheel 34 continues its rotation until it arrives opposite the filler 16, the vessel 12 then being loaded onto one of the stations PR of the filler 16.

By virtue of the variable-pitch wheel 38, it is possible in one and the same installation 10 to produce vessels 12 for the blowing 14 and filling 16 units to have mutually different pitches, and different numbers of stations.

Advantageously, the vessels carry out, from the vessel blower to the filler, a travel enabling them to be cooled before they are filled.

Preferably, cooling means (not represented) are positioned on the travel of the vessels which are successively conveyed by the first transmission wheel, the variable-pitch wheel and the second transmission wheel, in particular cooling means based on the projection of air or water targeting more particularly the bottom of the vessel so as to avoid the risk of it toppling over.

Figure 2:
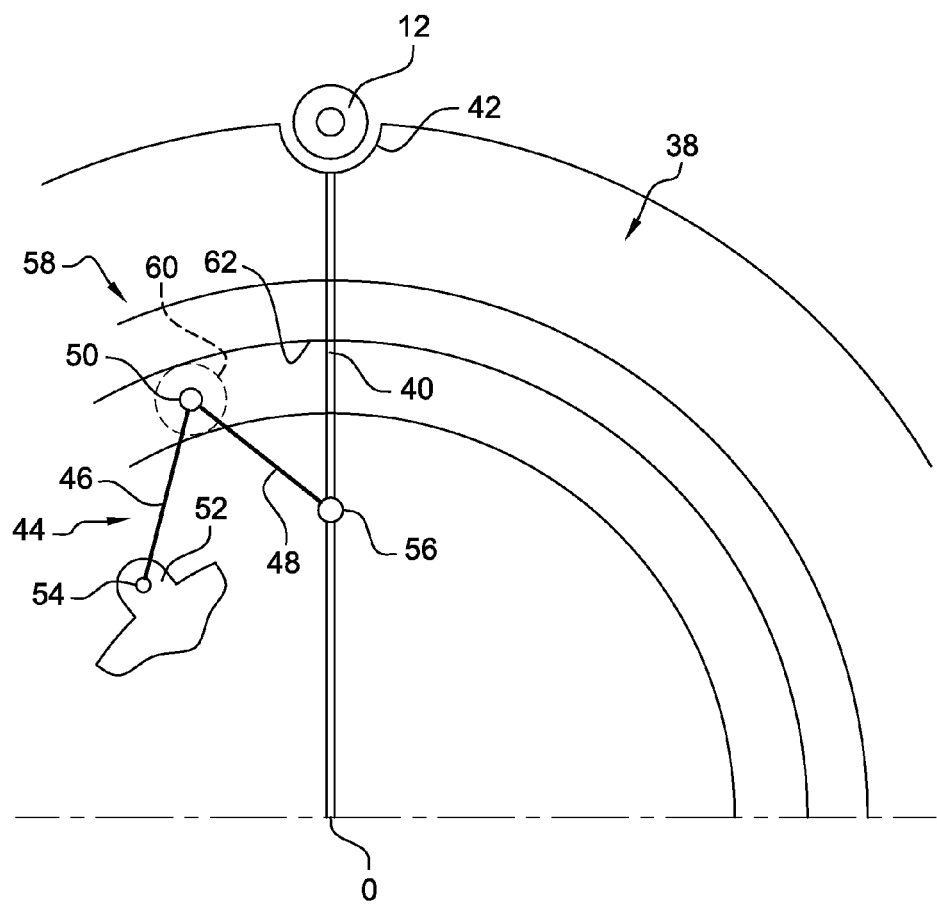
FIG. 2 is a schematic view which represents a preferred embodiment of the displacement control means associated with each transfer means of the variable-pitch wheel which are intended to ensure the variation of the pitch between the loading and unloading positions.

There now follows a description, according to the invention, of a preferred exemplary embodiment of the control means 44 of the transfer means 40 of the variable-pitch wheel 38 which are schematically represented in FIG. 2.

The control means 44 of each transfer means 40 of the variable-pitch wheel 38 comprise variable-length means which are intended to ensure the variation of the pitch between at least the initial pitch P and the final pitch P'.

Preferably, the variable-length means comprise at least one first link rod 46 and one second link rod 48 which are linked together at one of their ends by a pivoting link 50.

The other end of the first link rod 46 is securely attached to rotational driving means 52 via a first pivot 54 while the other end of the second link rod 48 is securely attached to the associated transfer means 40 via a second pivot 56.

The transfer means 40 is mounted to move in rotation at one of its radially internal ends about the axis of rotation O of the wheel 38 and comprises, at its other free end, holding means 42 for a vessel 12.

Thus, the transfer means 40 and the means 52 intended to drive it rotationally are linked in displacement by the assembly of the articulated link rods 46 and 48 and the distance between the fixed points respectively formed by the first pivot 54 and the second pivot 56 can vary depending on the relative position of each of the link rods 46, 48.

The control means 44 comprise actuation means 58 which, intended to selectively drive said variable-length means 46, 48, comprise at least one roller 60 which cooperates with a complementary guiding cam 62 determining, in the loopwise travel of the transfer means 40, the variation of pitch of said transfer means 40 relative to the transfer means 40 directly preceding it in the direction of rotation of the variable-pitch wheel 38.

Advantageously, the roller 60 of the actuation means 58 has an axis of rotation which is common with the pivoting axis of the pivoting link 50 linking the first and second link rods 46, 48 of the variable-length means.

The actuation means 58 are therefore designed to act on the means that form the link rods 46 and 48 in order to provoke the spacing or the convergence of the pivots 54 and 56 and thus vary the relative position of the transfer means 40 relative to the other transfer means 40, that is to say, vary the pitch, in particular the spacing relative to the transfer means 40 preceding it and also supporting a vessel 12.

Preferably, the cam 62 is configured to selectively ensure the variation of the pitch of the transfer means 40 when each transfer means 40 is driven around the axis of rotation O in said loopwise travel.

Advantageously, the cam 62 selectively ensures the variation of the pitch of the transfer means 40 so that the pitch of the transfer means 40 varies from the value of the initial pitch P to the final pitch P' when the transfer means 40 travel over a section, called go section, of the cam 62 which extends from the loading position in the first region Z1 to the unloading position in the second region Z2 and, conversely, from the final pitch P' to the initial pitch P when the transfer means 40 travel over a section, called return section, of the cam 62 which extends from the unloading position in the second region Z2 to the loading position in the first region Z1.

Thus, since the value of the final pitch P' is less than the value of the initial pitch P, the cam 62 advantageously includes at least a first cam section T1 and a second cam section T2.

The first section T1 of the cam 62 is arranged upstream of the loading position and downstream of the unloading position and the first cam section T1 is capable of slowing down the transfer means 40 traveling over it to increase the spacing between this transfer means 40 and the transfer means 40 which, in the direction of rotation of the variable-pitch wheel 38, directly precedes it.

This means that each transfer means 40 is successively introduced into the loading position with an initial pitch P which, determined relative to the transfer means 40 preceding it there, is at least equal to the first pitch P1 of the vessel blower 14.

The second section T2 of the cam 62 is arranged upstream of the unloading position and downstream of the loading position and the second cam section T2 is capable of speeding up the transfer means 40 traveling over it to reduce the spacing between this transfer means 40 and the transfer means 40 which, depending on the direction of rotation of the variable-pitch wheel 38, directly precedes it.

This means that each transfer means 40 is successively introduced into the unloading position with a final pitch P' which, determined relative to the transfer means 40 preceding it, is equal to the second pitch P2 of the filler 16.

Advantageously, the guiding cam 62 is borne by a circular deck mounted on the axis of rotation O of the variable-pitch wheel 38 so that the variation of pitch between the initial pitch P and the final pitch P' is able to be easily modified by changing said deck including the cam 62.

The actuation means 58 based on shape cooperation between a roller 60 and the cam 62 complementing one another that have just been described with reference to FIG. 2 constitute only one possible exemplary embodiment for implementing the function for selectively varying the pitch by acting on the control means 44.

As a variant, other actuation means 58, such as electrical or electromechanical means in particular, can also be used to obtain the selective variation of the pitch between two successive transfer means 40.

As a nonlimiting example, the actuation means 58 of the link with two articulated link rods 46 and 48 forming the control means 44 could be implemented by an actuator of electrical, hydraulic or pneumatic type controlling, for example, a rod designed to act on said control means 44.

Preferably, the actuation means 58 act on the pivoting link 50 with two link rods 46, 48 in order to selectively modify the position of the link rods between at least one first position corresponding to the initial pitch P and one second position corresponding to the final pitch P'.

Advantageously, the implementation of an intermediate transfer wheel 38 with variable pitch is in no way limited to the application described previously, namely allowing for the operation of units, such as a vessel blower and a filler, having a different station-to-station pitch.

In practice, an installation 10 should advantageously be multipurpose and allow for the production of different vessels, in particular the production of bottles with different volumes or shapes, for example equally with a value of 0.5 l and values of 1.5 or 2 l.

Consequently, to start the production of 1.5 l vessels for example after having produced 0.5 l vessels, modifications must first be made to the production installation 10 and its units 14, 16.

Advantageously, the filler 16 more often than not requires little in the way of modifications in order to fill vessels of different volumes or shapes.

Thus, when the filling station PS is in particular equipped with support means capable of holding the vessel 12 suspended by its neck in the filling position, it is then unimportant whether the body of the vessel extending vertically in the void under the support means is that of a small or large volume vessel.

However, the same does not apply to the vessel blower 14 for which major modifications must often be made before starting production of another vessel 12.

It will be understood that the molds 26 for producing a vessel 12 of 0.5 l or of 1.5 l are not the same and that the blowing stations PS of the vessel blower 14 must then be adapted, in particular with new molds 26 mounted on the carousel.

Obviously, such is also the case when starting production of a new vessel 12 which, whether or not of the same volume, has a different shape obtained by means of a new mold 26 including the corresponding cavity and which is intended to be filled with another product.

It is with this logic concerning the improved flexibility of the installation 10 in mind that the variable-pitch wheel 38 described previously is advantageously applicable by offering wide flexibility of use.

In practice, sometimes there is a wish not to use all the blowing stations PS of the vessel blower 14, but, for example, only half of them.

There may be various reasons for such a use of a reduced number of blowing stations PS.

Among these reasons, there are, for example, the search for an overall reduction in costs, such as the significant mold acquisition costs or the costs attributable to production downtime, with efforts then focused on reducing the time needed to make the requisite changes to the installation 10 in order to start production of a new vessel 12.

Such will also be the case if the vessel blower deliberately operates in a degraded mode, that is to say, not at its maximum rate, in particular to allow for vessels of complex shapes to be blown.

Furthermore, the use of a reduced number of blowing stations PS can sometimes be partly compensated by an increase in the rate of operation of the vessel blower 14, but within the limits of the maximum rate that the vessel blower can achieve.

However, in an installation 10 comprising a vessel blower 14 and a filler 16 having one and the same operating pitch and a transfer device according to the state of the art, the partial use of half the total number of blowing stations PS also results in only half the filling stations PR being used on the filler 16.

Now, it is preferable for all the filling stations to be used to limit the risks of pollution of the stations that are not occupied by a vessel 12.

By virtue of the variable-pitch wheel 38, it is also possible to ensure total operating flexibility of the installation 10 when, whether or not the units 14, 16 have the same operating pitch, there is a desire more particularly to use only some of the blowing stations PS but nevertheless all of the filling stations PR.

There now follows a description, by way of nonlimiting example, of such a particular application in which the transfer device 38 of an installation 10 for producing vessels 12, similar to that of FIG. 1, comprises at least one variable-pitch wheel 38 according to the invention.

Such an application in which the vessel blower 14 operates at a rate of one blowing station PS out of two is more particularly represented in FIGS. 1 and 3 to 10 which successively illustrate the various steps thereof.

As can be seen in FIG. 1, the spacing between two consecutive blowing stations PS of the vessel blower 14 is equal to a first pitch P1 corresponding here to an angle $\alpha_1$.

Preferably, to avoid the abovementioned risks of contamination of the unused filling stations, all the filling stations PR of the filler 16 are used and the spacing between two consecutive filling stations PR of the filler is equal to a second pitch P2 corresponding to an angle $\alpha_2$.

In order to systematically transfer a vessel 12 to each filling station PR, the variable-pitch wheel 38 must be controlled synchronously for each transfer means 40 to follow the others in the unloading region with a final pitch P' which is equal to the second pitch P2.

Preferably, the vessel 12 is here transferred, from the unloading region of the variable-pitch wheel 38 to the filler 16, via one of the transmission means 36 of the second transmission wheel 34.

As a variant, the vessel 12 is transferred directly to the filling station PR in the absence of such a second transmission wheel 34.

In the present application example, the variable-pitch wheel 38 is capable of transferring each vessel 12 from the blowing station PS to the filling station PR by introducing, relative to the transfer means 40 preceding it in the direction of rotation of the wheel 38, on the one hand a transfer means 40 in the loading position with an initial pitch P which is equal to twice the first pitch P1 and, on the other hand, a transfer means 40 in the unloaded position with a final pitch P' which is equal to the second pitch P2.

Advantageously in the particular application, the value of the initial pitch P therefore corresponds to twice the value of the first pitch P1 in order for a transfer means 40 of the variable-pitch wheel 38 to be introduced synchronously into the loading position at a rate of one transmission means 32 out of two of the first transmission wheel 30 which corresponds to the use of one blowing station PS out of two of the vessel blower 14.

FIG. 1 illustrates the taking-over of a first vessel 12 which has just been produced at the blowing station PS3 whose mold 26, in this case of portfolio type, is opened to allow a first transmission means 32 of the first transmission wheel 30 to load said first vessel 12.

In the present case, the mold 26 of the second blowing station PS2 has no vessel 12 since no preform 1 has been introduced therein in the input region E, the second transmission means 32 following the first in the direction of rotation indicated by the arrows is therefore empty while the third transmission means 32 following the second will take charge of the second vessel 12 produced by the first blowing station PS1.

Preferably, the blowing station PS2 has no mold 26.

The transmission means 32 of the first transmission wheel 30 are driven in rotation around the axis of rotation O1 about which they are evenly distributed with a determined pitch equal to the first pitch P1.

After loading of the manufactured vessels 12, the transmission means 32 each continue their travel until they reach the first loading region Z1 that the variable-pitch wheel 38 has in common with it and does so with a spacing between the transmission means 32 which remains constantly equal to the first pitch P1.

Figure 3:
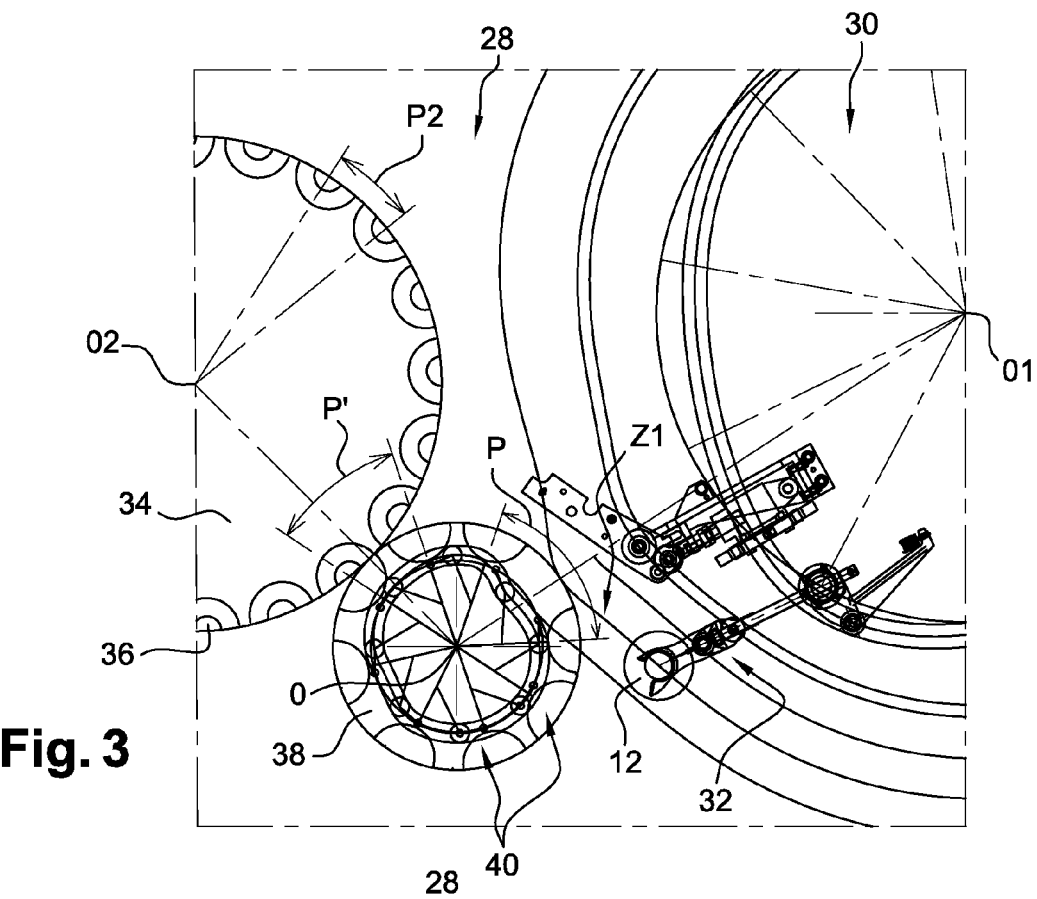

FIG. 3 more particularly illustrates the arrival of the first transmission means 32 of the first transmission wheel 30 in the first region Z1 in which a transfer means 40 of the variable-pitch wheel 38 is also positioned parallel and synchronously, in particular the holding means 42 of the means 40 are positioned around the vessel 12.

Figure 4:
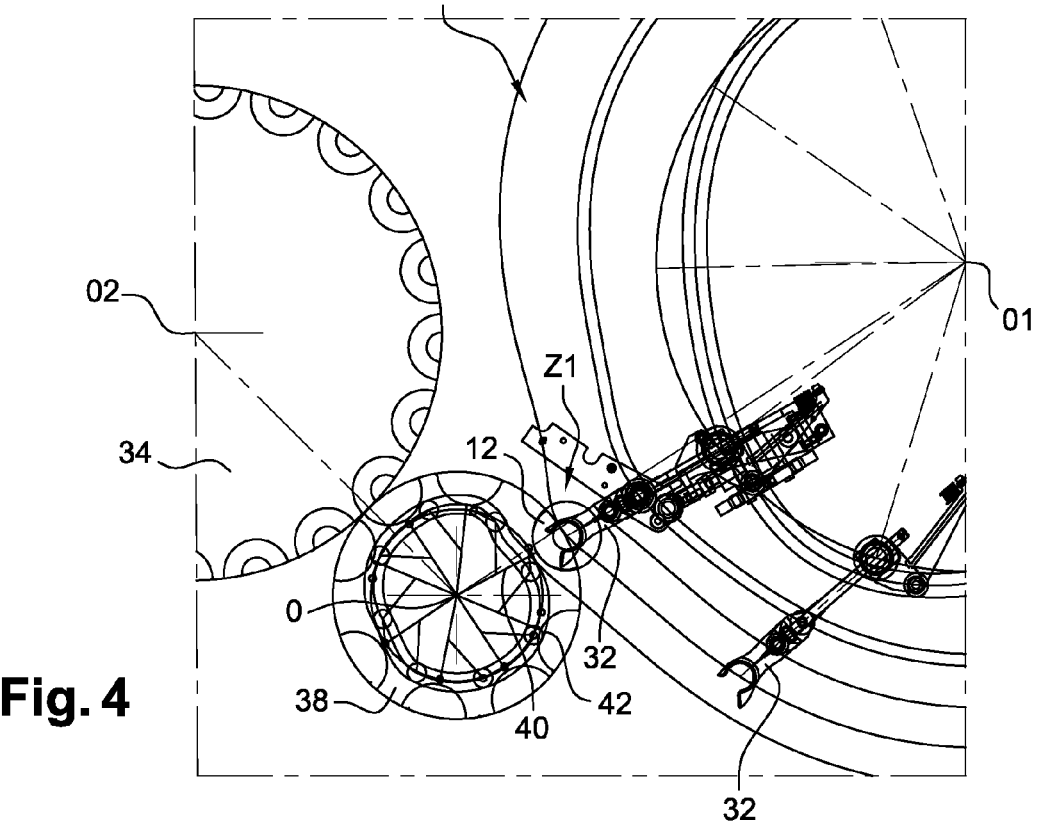

The transfer means 40 then reaches the so-called loading position illustrated in FIG. 4, that is to say, the position in which the transfer means 40 and the transmission means 32 are situated radially opposite one another, the transfer of the first vessel 12 from one to the other taking place from the moment when this loading position is reached.

Figure 5:
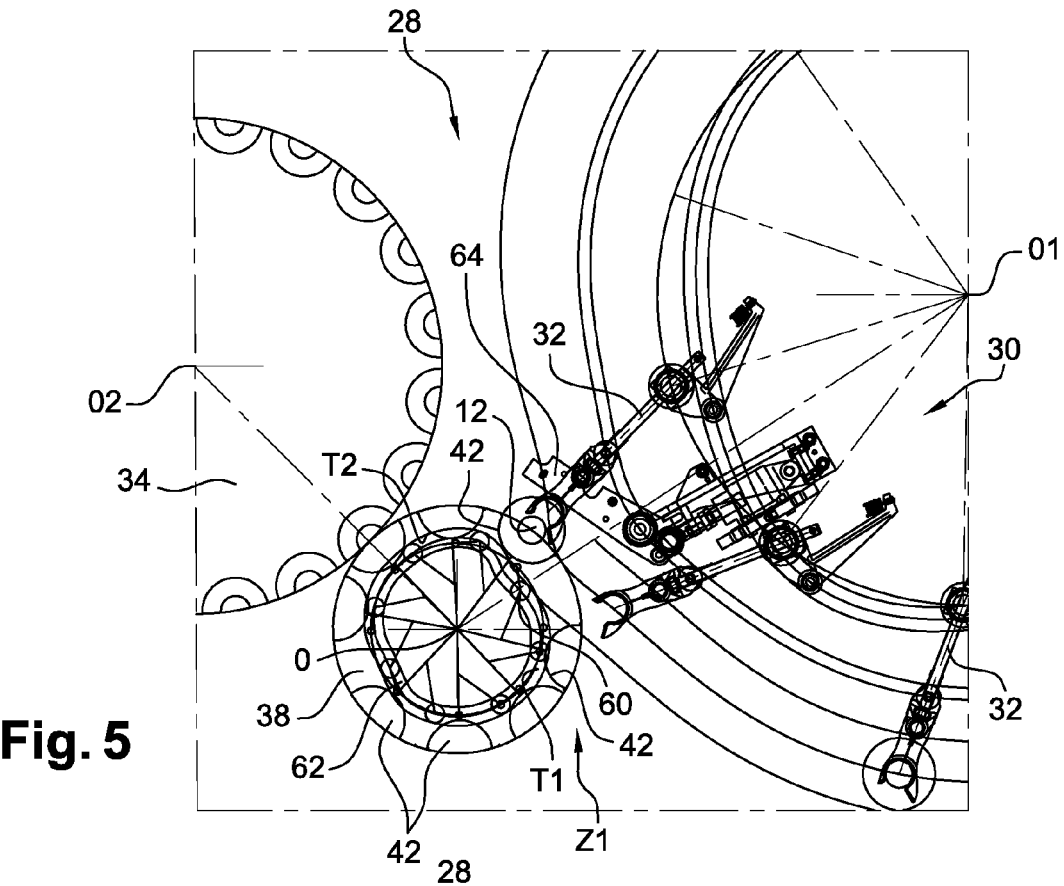

The transmission means 32 and the transfer means 40 continue their respective rotation just the same after having passed through the first region Z1 of tangency between the wheels 30 and 38, and the means 32 and 40 then separate respectively from one another as is illustrated by FIG. 5.

Advantageously, each transmission means 32 includes a portion which, supporting the vessel 12, can pivot to accompany the operations of loading from the mold 26 and of unloading to the transfer means 40 of the variable-pitch wheel 38.

Advantageously, guiding means 64 are arranged in the vicinity of the first region Z1 of tangency between the wheels 30 and 38 to facilitate the release of the vessels to the transfer means 40 of the variable-pitch wheel 38.

While the first transmission means 32 has released the first vessel 12, now held by the holding means 42 of the transfer means 40 of the variable-pitch wheel 38 which continues its rotation to the unloading position downstream, the second transmission means 32 which, distant by a first pitch P1 from the means 32 preceding it, is introduced in turn, although empty, into the first loading region Z1.

Figure 6:
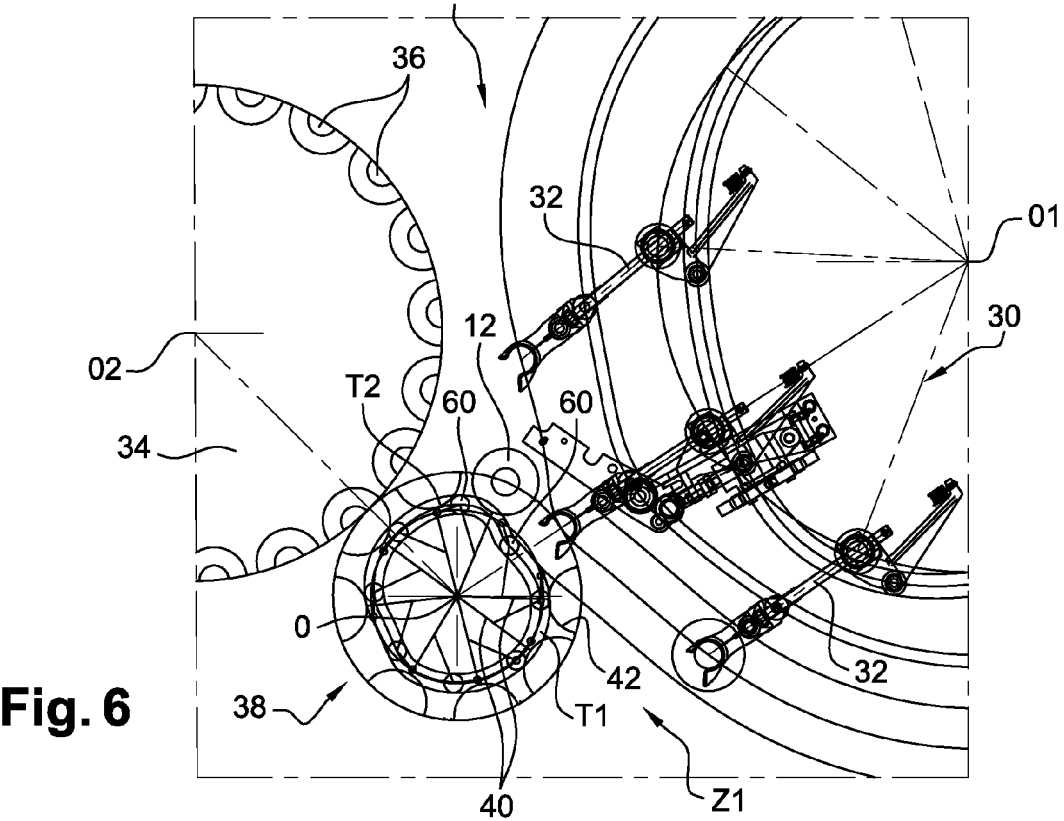

In the present application and as FIGS. 4 to 6 illustrate in succession by comparison, the second transmission means 32 without any vessel 12 passes through the first loading region Z1 without any transfer means 40 of the variable-pitch wheel 38 appearing opposite, by default such a transfer means 40 would have no vessel 12 and all the filling stations PS would not each be loaded with a vessel 12.

This is why the actuation means 58 of the control means 44 will act in succession on the variable-length means consisting of the two link rods 46 and 48 in order to provoke, in succession, a slowing down of the transfer means 40 so that it is introduced into the loading position with an initial pitch P which, since it is equal to twice the first pitch P1, ensures its synchronization with the third transmission means 32 of the second transmission wheel 30 including the second manufactured vessel 12 obtained from the mold 26 of the first blowing station PS1.

For this, the cam 62 includes at least a first cam section T1 which is arranged upstream of the loading position and downstream of the unloading position.

The first cam section T1 is capable of slowing down the transfer means 40 whose roller 60 travels over the first section T1 of the cam 62 to increase the spacing between this transfer means 40 and the transfer means 40, in the direction of rotation of the variable-pitch wheel 38, directly precedes it.

Because of this, the transmission means 32 which is empty passes through the first region Z1 and the transfer means 40 which succeeds the transfer means 40 having taken charge of the vessel 12 from the blowing station PS3 will advantageously be slowed down to be synchronized with the next transmission means 32 which includes the next vessel 12 from the first blowing station PS1, which is more particularly illustrated in FIGS. 7 and 8.

The actuation means 58 of the variable-length means of the wheel 38 are therefore configured so that each transfer means 40 is introduced in succession into the loading position with an initial pitch P which, determined relative to the transfer means 40 preceding it, is equal to twice the first pitch P1 for the present particular application.

As illustrated in FIG. 8, since the initial pitch P is equal to twice the first pitch P1, the transfer means 40 is introduced into the loading position synchronously with the transmission means 32 including the second vessel 12.

The transfer of the vessel 12 from one to the other is performed as described previously for the vessel 12 from the blowing station PS3.

After the transfer, the variable-pitch wheel 38 therefore has two vessels 12 supported respectively by the holding means of a transfer means 40, the two transfer means 40 following one another with a spacing between them which is substantially equal to the initial pitch P, therefore to twice the first pitch P1.

Now, in order to transfer each of these vessels 12 to one of the filling stations PR of the filler 16, the transfer means 40 supporting the vessels 12 must be brought into the second unloading region Z2 of the wheel 38 with a final pitch P' between them which is equal to the second pitch P2 corresponding to the spacing between two successive filling stations PS.

Since the value of the final pitch P' is in this case less than the value of the initial pitch P, the transfer means 40 in second position must be speeded up to catch up with the one preceding it and obtain a spacing between them which is equal to the second pitch P2.

Figure 9:
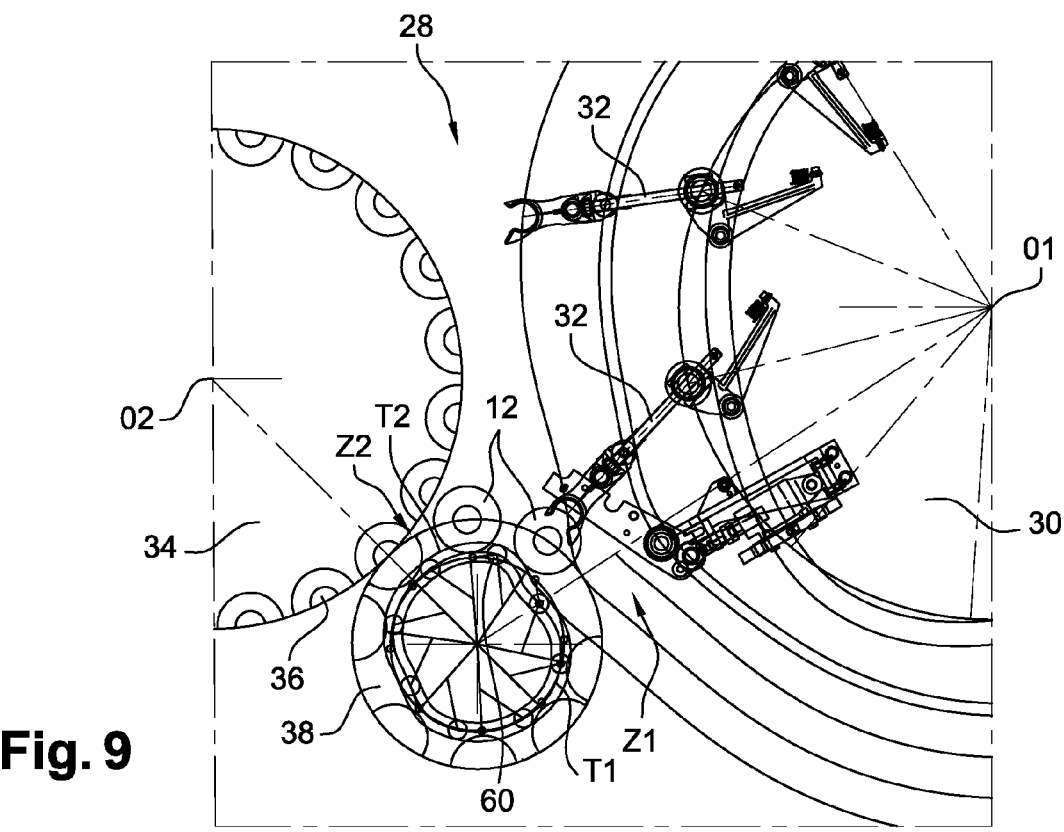

For this, and as illustrated in FIG. 9, the actuation means 58 will again act on the variable-length means formed by the link rods 46 and 48 so as to obtain the change of pitch, from the initial pitch P equal to twice the pitch P1 to the final pitch P' equal to the second pitch P2.

For this, the cam 62 includes a second cam section T2 which is arranged upstream of the unloading position and downstream of the loading position.

The second cam section T2 is configured so that, when the roller 60 of the transfer means 40 in second position travels over it, an acceleration occurs which is designed to reduce the spacing with the transfer means 40 preceding it and therefore a reduction of the pitch to the value of the final pitch P' equal to the second pitch P2.

The second cam section T2 is therefore capable of speeding up the roller 60 of the associated transfer means 40 traveling over it to reduce the spacing between this transfer means 40 and the transfer means 40 which, in the direction of rotation of the variable-pitch wheel, precedes it.

Because of this, each transfer means 40 is introduced in succession into the unloading position with a final pitch P' which, determined relative to the transfer means preceding it, is equal to the second pitch P2 of the filler 16.

Figure 10:
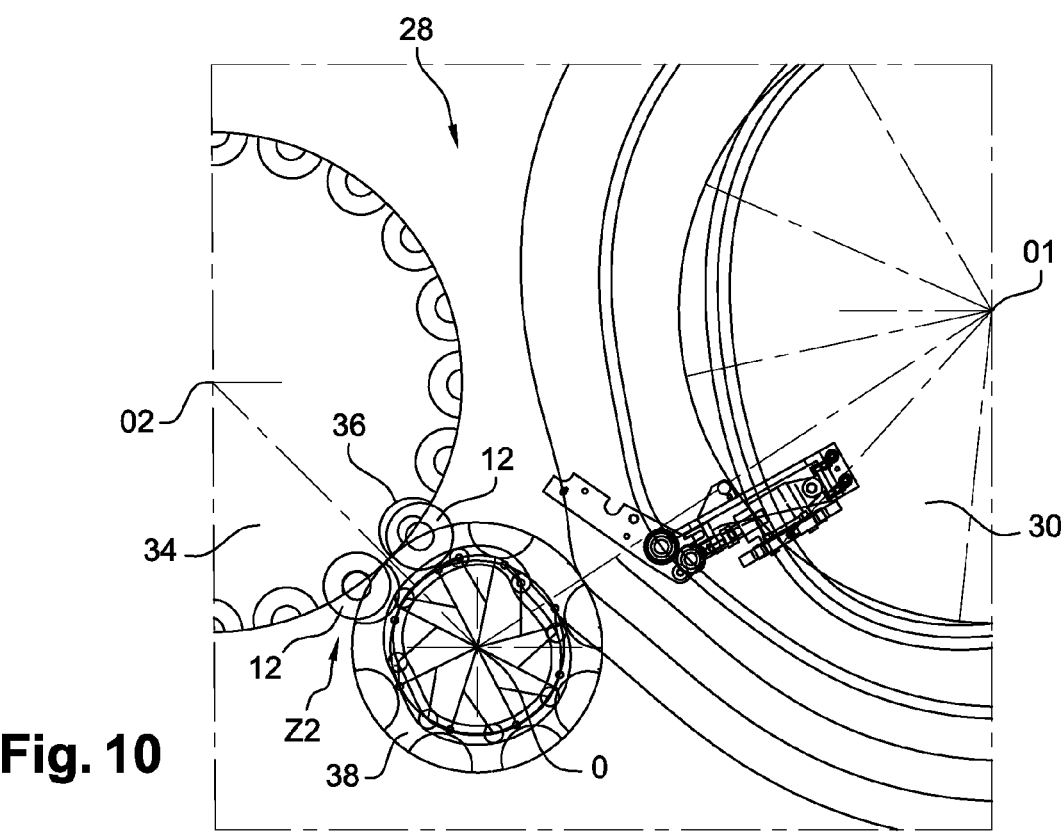

Preferably, since the transfer device 28 comprises a second transmission wheel 34, the vessels 12 are—as illustrated in FIG. 10—transferred to the holding means 36 of the second transmission wheel 34, which wheel 34 will then transfer each of the vessels 12, received with a pitch equal to the second pitch P2, to each of the filling stations PR which will then be occupied by a vessel 12.

Advantageously, the cam 62 is configured to selectively ensure the variation of the pitch between the transfer means 40 when each transfer means 40 is driven around the axis of rotation O according to said loopwise travel and more specifically so that the pitch of the transfer means varies from the value of the initial pitch P to the final pitch P' when the transfer means 40 travel over a portion, called go portion, of the cam 62 which, extending from the loading position in the first region Z1 to the unloading position in the second region Z2 corresponding to the second section T2 and, conversely, the pitch of the transfer means 40 varies from the value of the final pitch P' to the initial pitch P when the transfer means 40 travel over a portion, called return portion, of the cam 62 which, extending from the unloading position in the second region Z2 to the loading position in the first region Z1, corresponds to the first cam section T1.

The driving means 52 are displaced around the axis of rotation O of the variable-pitch wheel 38 at a constant speed so that the speeding up or slowing down undergone by each transfer means 40 to obtain the desired pitch is only due to the control means 44, in this case to the displacement of the roller 60 in the corresponding sections T1, T2 of the guiding cam 62 which form the actuation means 58 acting on the variable-length means 46, 48.

The invention relates to a variable-pitch wheel 38 for an installation 10 for producing vessels 12, said variable-pitch wheel 38, which is interposed between a vessel blower 14 having a first pitch P1 and the filler 16 having a second pitch P2, comprising transfer means 40 controlled by control means 44 capable of selectively varying the pitch between two consecutive transfer means 40 between an initial pitch P and a final pitch P', the initial pitch P being, for example, equal to or twice the first pitch P1 and the final pitch P' equal to the second pitch P2.

The invention claimed is:

1. An installation (10) for producing vessels (12), in particular bottles, comprising at least:

a vessel production unit comprising at least one vessel blower (14) which comprises a plurality of blowing stations (PS) which are distributed circumferentially around an axis of rotation (O14) with a spacing corresponding to a first pitch (P1) between two consecutive stations (PS), a filling unit, called filler (16), comprising a plurality of filling stations (PR) which are distributed circumferentially around an axis of rotation (O16) with a spacing corresponding to a second pitch (P2) between two consecutive stations (PR), and a vessel transfer device (28) comprising at least, interposed between the vessel blower (14) and the filler (16), a transfer wheel (38), called a variable-pitch transfer wheel, comprising means (40) for transferring vessels (12) which are mounted to move in rotation and distributed circumferentially around an axis of rotation (O), said transfer means (40) being controlled independently of one another by associated control means (44) which are capable of selectively varying the pitch corresponding to the spacing between two successive transfer means (40) in a travel executed in a loop between, upstream, a first region (Z1) for loading each vessel (12) obtained from the vessel blower and, downstream, a second region (Z2) for unloading each vessel (12) to the filler (16), said transfer means (40) being introduced in succession, on the one hand, into said first loading region (Z1) with an initial pitch (P) corresponding at least to the first pitch (P1) of the vessel blower (14) to occupy a determined loading position and, on the other hand, into said second unloading region (Z2) with a final pitch (P') corresponding to the second pitch (P2) of the filler (16) to occupy a determined unloading position, wherein, the control means (44) of each transfer means (40) of the variable-pitch wheel (38) comprise variable-length means (46, 48) which, intended to ensure the variation of the pitch between at least the initial pitch (P) and the final pitch (P'), comprise at least a first link rod (46) and a second link rod (48) which are linked together at one of their ends by a pivoting link (50), the other end of the first link rod (46) being securely attached via a first pivot (54) to rotational driving means (52) and the other end of the second link rod (48) being securely attached via a second pivot (56) to the associated transfer means (40), and the control means (44) further comprise actuation means (58) which, intended to selectively drive said variable-length means (46, 48), comprise at least one roller (60) which cooperates with a complementary guiding cam (62) determining, in the loopwise travel of the transfer means (40), the variation of the pitch between the initial pitch (P) and the final pitch (P') of said transfer means (40) relative to the transfer means (40) directly preceding it in the direction of rotation of the variable-pitch wheel (38), and the roller (60) of the actuation means (58) has an axis of rotation which is common with the pivoting axis of the pivoting link (50) linking the first and second link rods (46, 48) of the variable-length means.

2. The installation (10) as claimed in claim 1, characterized in that, the final pitch (P') being less than the initial pitch (P), the cam (62) comprises at least:

a first cam section (T1) which, arranged upstream of the loading position and downstream of the unloading position, is capable of slowing down the transfer means (40) traveling over it to increase the spacing between this transfer means (40) and the transfer means (40) directly preceding it in the direction of rotation of the variable-pitch wheel (38) so that each transfer means (40) is introduced in succession into the loading position with an initial pitch (P) which, determined relative to the transfer means (40) preceding it, is at least equal to the first pitch (P1) of the vessel blower (14), in particular equal to twice the first pitch (P1), and a second cam section (T2) which, arranged upstream of the unloading position and downstream of the loading position, is capable of speeding up the transfer means (40) traveling over it to reduce the spacing between this transfer means (40) and the transfer means (40) directly preceding it in the direction of rotation of the variable-pitch wheel (38) so that each transfer means (40) is introduced in succession into the unloading position with a final pitch (P') which, determined relative to the transfer means (40) preceding it, is equal to the second pitch (P2) of the filler (16).

3. The installation (10) as claimed in claim 1, characterized in that the vessel transfer device (28) comprises, upstream, interposed between the vessel blower (14) and the variable-pitch wheel (38), at least one first transmission wheel (30) which, associated with the vessel blower (14), comprises first transmission means (32) capable of unloading, from the blowing station (PS), each vessel (12) that is produced and of bringing said vessel (12) into the first loading region (Z1) of the variable-pitch wheel (38) in order to transfer said vessel (12) to the transfer means (40) of the variable-pitch wheel (38) positioned radially opposite.

4. The installation (10) as claimed in claim 3, characterized in that the vessel transfer device (28) comprises, downstream, interposed between the variable-pitch wheel (38) and the filler (16), at least one second transmission wheel (34) which, associated with the filler (16), comprises second transmission means (36) capable of unloading, from the second unloading region (Z2), each vessel (12) that is transferred by one of the transfer means (40) of the variable-pitch wheel (38) and of bringing each vessel (12) to one of the filling stations (PR) of the filler (16).

5. The installation (10) as claimed in claim 4, characterized in that the first transmission means (32) of the first wheel (30) are arranged with a constant spacing between two consecutive means (30), the value of which is equal to the first pitch (P1) of the vessel blower (14) and in that the second transmission means (36) of the second wheel (34) are arranged with a constant spacing between two consecutive means (36), the value of which is equal to the second pitch (P2) of the filler (16).

6. The installation (10) as claimed in claim 1, characterized in that the initial pitch (P) of the variable-pitch wheel (38) is equal to twice the value of the first pitch (P1) of the vessel blower (14), so that a transfer means (40) of the variable-pitch wheel (38) is introduced synchronously into the loading position at a rate of one blowing station (PS) out of two of the vessel blowers (14) or at a rate of one transmission means (32) out of two of a first transmission wheel (30).

7. The installation (10) as claimed in claim 1, characterized in that the final pitch (P') of the variable-pitch wheel (38) is equal to the second pitch (P2), so that a transfer means (40) of the variable-pitch wheel (38) is introduced synchronously into the unloading position to systematically transfer a vessel (12) to each filling station (PR) or to each transmission means (36) of a second transmission wheel (34).

8. The installation (10) as claimed in claim 1, characterized in that the vessel transfer device (28) comprises, downstream, interposed between the variable-pitch wheel (38) and the filler (16), at least one second transmission wheel (34) which, associated with the filler (16), comprises second transmission means (36) capable of unloading, from the second unloading region (Z2), each vessel (12) that is transferred by one of the transfer means (40) of the variable-pitch wheel (38) and of bringing each vessel (12) to one of the filling stations (PR) of the filler (16).

* * * * *